(12) United States Patent
Heinisch et al.

(10) Patent No.: US 10,965,816 B2
(45) Date of Patent: Mar. 30, 2021

(54) METHOD FOR TESTING AN AUDIO COMMUNICATION SYSTEM OF AN AIR-CRAFT, AND AIRCRAFT HAVING AN AUDIO COMMUNICATION SYSTEM

(71) Applicant: Airbus Operations GmbH, Hamburg (DE)

(72) Inventors: Matthias Heinisch, Hamburg (DE); Hans-Achim Bauer, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 16/418,536

(22) Filed: May 21, 2019

(65) Prior Publication Data
US 2019/0364152 A1 Nov. 28, 2019

(30) Foreign Application Priority Data
May 23, 2018 (DE) .......................... 102018208073.9

(51) Int. Cl.
*H04M 5/00* (2006.01)
*H01R 13/66* (2006.01)
*H04R 3/00* (2006.01)
*H04R 29/00* (2006.01)

(52) U.S. Cl.
CPC .......... *H04M 5/00* (2013.01); *H01R 13/6683* (2013.01); *H04R 3/00* (2013.01); *H04R 29/00* (2013.01); *H04R 2420/05* (2013.01)

(58) Field of Classification Search
USPC .......................................................... 379/1
See application file for complete search history.

(56) References Cited

U.S. PATENT DOCUMENTS

| 2003/0235311 | A1  | 12/2003 | Grancea et al. |
| 2011/0033064 | A1* | 2/2011  | Johnson ............... H04R 1/1083 381/94.1 |
| 2011/0150234 | A1* | 6/2011  | Johnson ................ H01R 29/00 381/74 |
| 2014/0241535 | A1* | 8/2014  | Poulsen ............... H04R 29/001 381/58 |
| 2015/0200498 | A1* | 7/2015  | Underwood ........... H01R 24/58 439/490 |

FOREIGN PATENT DOCUMENTS

DE     102007009574 B3    11/2008

OTHER PUBLICATIONS

German Search Report; priority document.

* cited by examiner

*Primary Examiner* — Amal S Zenati
(74) *Attorney, Agent, or Firm* — Greer, Burns & Crain, Ltd.

(57) ABSTRACT

In a method for testing an audio communication system of an aircraft, it is detected whether a jack plug of a headset is plugged into a jack of the audio communication system. Subject to the condition that no jack plug is detected, an electrical connection is made between an audio output of the jack and a microphone input of the jack by means of a test bridge circuit provided for at the jack. Furthermore, a test input signal is applied to an audio input connected to the audio output of the jack, and a test output signal is tapped off at a microphone output connected to the microphone input of the jack. The test output signal is used to ascertain a functional state of the audio communication system. Furthermore, an aircraft having an audio communication system is described.

13 Claims, 2 Drawing Sheets

METHOD FOR TESTING AN AUDIO COMMUNICATION SYSTEM OF AN AIR-CRAFT, AND AIRCRAFT HAVING AN AUDIO COMMUNICATION SYSTEM

CROSS-REFERENCES TO RELATED APPLICATIONS

This application claims the benefit of the German patent application No. 10 2018 208 073.9 filed on May 23, 2018, the entire disclosures of which are incorporated herein by way of reference.

FIELD OF THE INVENTION

The present invention relates to a method for testing an audio communication system of an aircraft and to an aircraft having an audio communication system.

BACKGROUND OF THE INVENTION

Modern aircraft typically have an audio communication system in order to allow communication between people who are in different locations on the aircraft. By way of example, the cockpit crew is supposed to be able to communicate with an engineer who is outside the aircraft, e.g., at the landing gear or at a wing of the aircraft, from the cockpit. To this end, a communication station in the aircraft interior is, for the most part, connected to jacks, provided for at multiple locations on the aircraft, that are configured for connecting headsets.

In order to test the functionality of such an audio communication system, it is usual for a first person to attend the communication station while a second person plugs a headset into each individual jack and attempts to establish communication with the first person. If this is not possible or possible only to a limited extent, e.g., because the second person cannot hear the first person or vice versa, a malfunction in the respective jack of the audio communication system is inferred.

A semi-automated test method for the output from audio output sockets provided for at passenger seats of an aircraft is described in U.S. Pat. No. 7,120,256 B2. According to this method, a standardized input signal is applied to the output sockets. A testing person plugs a test unit into each individual output socket, the test unit being configured to use the signal tapped off at the output socket and the test input signal to ascertain the functionality of the respective socket.

SUMMARY OF THE INVENTION

It is an object of the present invention to provide an aircraft having an audio communication system that can be tested in a simple and time-saving manner, and an improved test method for such an audio communication system.

According to a first aspect of the invention, there is provision for a method for testing an audio communication system of an aircraft. A first step of the method involves detecting whether a jack plug of a headset is plugged into a jack of the audio communication system. The in-use state of the jack is thus checked. Subject to the condition that no jack plug is detected or that the jack is in an unused state without a jack plug plugged in, a further step involves making an electrical connection between an audio output of the jack and a microphone input of the jack by means of a test bridge circuit provided for at the jack. The test bridge circuit therefore connects the audio output to the microphone input of the jack. Furthermore, a test input signal is applied to an audio input of the audio communication system, which audio input is connected to the audio output of the jack. That is to say, an audio input, for example a connection point provided for in the cockpit of the aircraft, is used to transmit to the audio output a signal that, subject to the condition that the jack is in an unused state, the test bridge circuit forwards as an input signal to the microphone input of the jack. A further step involves tapping off a test output signal at a microphone output connected to the microphone input of the jack. This results in a signal coming from the microphone input of the jack being tapped off at an output of the audio communication system, for example at a connection point provided for in the cockpit of the aircraft. A further method step involves the test output signal being used to ascertain a functional state of the audio communication system. This step consequently involves the test output signal being evaluated, for example the signal strength of the test output signal. If the signal strength is zero, for example, or if it is below a threshold value, it is possible to infer an erroneous functional state of the jack or of the connection to the jack, e.g., of wiring.

It is one of the concepts of the invention to transmit a test input signal from a test point, e.g., from a communication station located in the cockpit of the aircraft, to an audio output of the jack, to forward the test input signal to a microphone input of the jack by means of a test bridge circuit provided for at the jack and to evaluate a test output signal coming from the microphone input of the jack at the test point. In this manner, a multiplicity of jacks can be tested from one and the same point in the aircraft without needing to get to the respective point of installation of the jacks in the aircraft. This represents a considerable time saving. In particular in the case of jacks that are difficult to access, e.g., on external structures of the aircraft or those that are beneath covers, this shortens the time required for testing. Further, detection of a jack plug additionally advantageously prevents jacks that are currently in use from being tested.

According to one embodiment of the method, there is provision for the test input signal to be applied to a first amplifier input, forming the audio input, of an amplifier of the audio communication system, and wherein a first amplifier output is connected to the audio output of the jack. Accordingly, the audio input and the audio output of the jack have a signal amplifier connected between them. This affords the advantage that the evaluation of the test output signal can also test the correct operation of the amplifier. Additionally, the test input signal can be influenced in a desired manner, in particular, the signal strength thereof.

Optionally, the test output signal can be tapped off at a second amplifier output, forming the microphone output, of the amplifier, wherein a second amplifier input of the amplifier is connected to the microphone input of the jack. That is to say, a signal amplifier is connected both between the microphone input of the jack and the microphone output and between the audio input and the audio output of the jack.

According to a further embodiment, a level of the test input signal is attenuated. This is advantageous, in particular, in order to match the test input signal to the power range of the microphone input of the jack. This ensures that the microphone input has a level applied to it that results in it transmitting a distinct signal to the microphone output, for example a low-noise signal. This further facilitates ascertainment of the functional state.

According to a further embodiment, there is provision for the level of the test input signal to be attenuated by means of the test bridge circuit. To this end, the test bridge circuit can have an attenuation element, for example. The attenuation of the level by means of the test bridge circuit affords the advantage that individual attenuation is performed at each jack.

According to a further embodiment, there is provision for the test input signal to be a wave signal of constant amplitude whose frequency periodically, in particular continuously, covers a prescribed range. By providing the test signal as what is known as a sweep, the functionality of the audio communication system, in particular the jack, can be tested for different operating states in one test step. This speeds up the method further and improves the accuracy of the method at the same time, since, for example, fault states that occur only in particular frequency ranges are more easily detectable.

According to a further embodiment, the ascertaining of the functional state of the audio communication system comprises comparing the test output signal with the test input signal and/or a comparison of the test output signal with a reference signal associated with the respective test input signal. A comparison of the test output signal with the test input signal results in the test input signal forming a reference signal, wherein the functional state is ascertained as faulty, for example when the test output signal differs from the test input signal by more than a predetermined value. This forms a solution that is very easily realized in terms of circuitry or software. The comparison of the test output signal with a reference signal that is not formed by the test input signal itself can be effected in the same manner.

As an alternative or in addition to the comparing of the test output signal with a reference signal, the ascertaining of the functional state of the audio communication system can also comprise an analysis of a time characteristic of the test output signal. This results in the signal characteristic being examined for the presence of interference criteria, such as, e.g., noise, crackle or the like, for example by means of an algorithm realized as software.

According to a further aspect of the invention, there is provision for an aircraft having an audio communication system. The audio communication system comprises at least one jack having an audio output, a microphone input, a plug detector and a test bridge circuit. The plug detector is configured to generate an interrupt signal when a jack plug of a headset is plugged into the jack. This can be an electrical or a mechanical interrupt signal. The test bridge circuit is connected to the plug detector and configured to interrupt an electrical connection between the audio output and the microphone input when the plug detector generates an interrupt signal. The plug detector therefore operates the test bridge circuit. In the simplest case, the test bridge circuit can be designed as a switch and the plug detector can be designed as a slider that is kinematically coupled to the switch and that, when a jack plug is plugged in, is displaced into the jack and thereby opens the switch. Furthermore, the audio communication system has an audio input, which is connected to the audio output of the jack, and a microphone output, which is connected to the microphone input of the jack. The audio communication system additionally has a signal processing apparatus that is connectable to the audio input and the microphone output. The signal processing apparatus is designed to apply a test input signal to the audio input, to tap off a test output signal at the microphone output and to use the test output signal to ascertain a functional state of the audio communication system.

The signal processing apparatus is, in particular, suitable for carrying out steps of the method described above and can be realized, for example, as a controller that has a data memory and a processor. The plug detector and the test bridge circuit are likewise suitable for carrying out steps of the method described above.

The audio communication system is able to be used to perform the method described above in an aircraft. The advantages and features described for the method therefore apply in an analogous manner for the aircraft as well. As already described on the basis of the method, the test bridge circuit operable by the plug detector affords the advantage, in particular, that a signal can be forwarded from the audio output of the jack to the microphone input of the jack, which means that a test on the socket or the wiring or connection leading thereto can be performed from a single point at which the audio input and the microphone output are located.

According to one embodiment of the aircraft, the audio communication system has an amplifier having a first amplifier input, forming the audio input, and a first amplifier output, connected to the audio output of the jack. Optionally, the amplifier further has a second amplifier output, forming the microphone output, and a second amplifier input, connected to the microphone input of the jack. Therefore, the audio input and the audio output of the jack and optionally also the microphone input of the jack and the microphone output have an amplifier connected between them.

According to a further embodiment, the aircraft has a multiplicity of jacks, wherein at least one jack is arranged on an external structure of the aircraft, for example on a wing, on the fuselage, in particular in the region of a fuel flap or of a receiving space of an air conditioning system, or in a receiving space for a landing gear. Jacks provided for on external structures of the aircraft are usually covered by flaps or are located in structures that are not readily accessible so that they are protected from environmental influences and damage. The test bridge circuit distinctly simplifies a functional check on these jacks, since this requires no actual physical access thereto.

The jacks may also be arranged in an interior of the aircraft fuselage, in particular in the hold or in the region of a rear pressure dome.

BRIEF DESCRIPTION OF THE DRAWINGS

The invention is explained below with reference to the figures of the drawings. Of the figures.

In the figures, the same reference signs denote components that are the same or that have the same function, unless indicated otherwise.

DETAILED DESCRIPTION OF THE PREFERRED EMBODIMENTS

Figure 1:
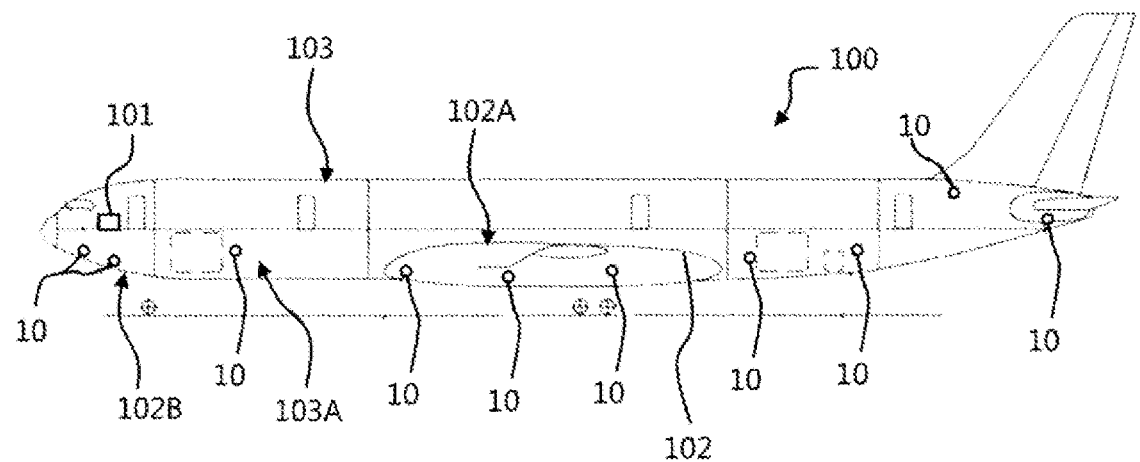
FIG. 1 shows a schematic view of an aircraft according to an exemplary embodiment of the present invention.

FIG. 1 shows, in exemplary fashion, an aircraft 100 that has an audio communication system 1 having a multiplicity of jacks 10 and a communication station 101. The communication station 101 may be arranged, for example, in the cockpit of the aircraft 100, as depicted schematically in FIG. 1. The jacks 10 are distributed over the aircraft 100, with provision being able to be made for one or more jacks 10, in particular on an external structure 102 of the aircraft 100, e.g., in the region of a wing 102A or a landing gear receptacle 102B. It goes without saying that there may also be provision for jacks 10 on an internal structure of the fuselage 103, e.g., in the region of a cargo space 103A.

Figure 2:
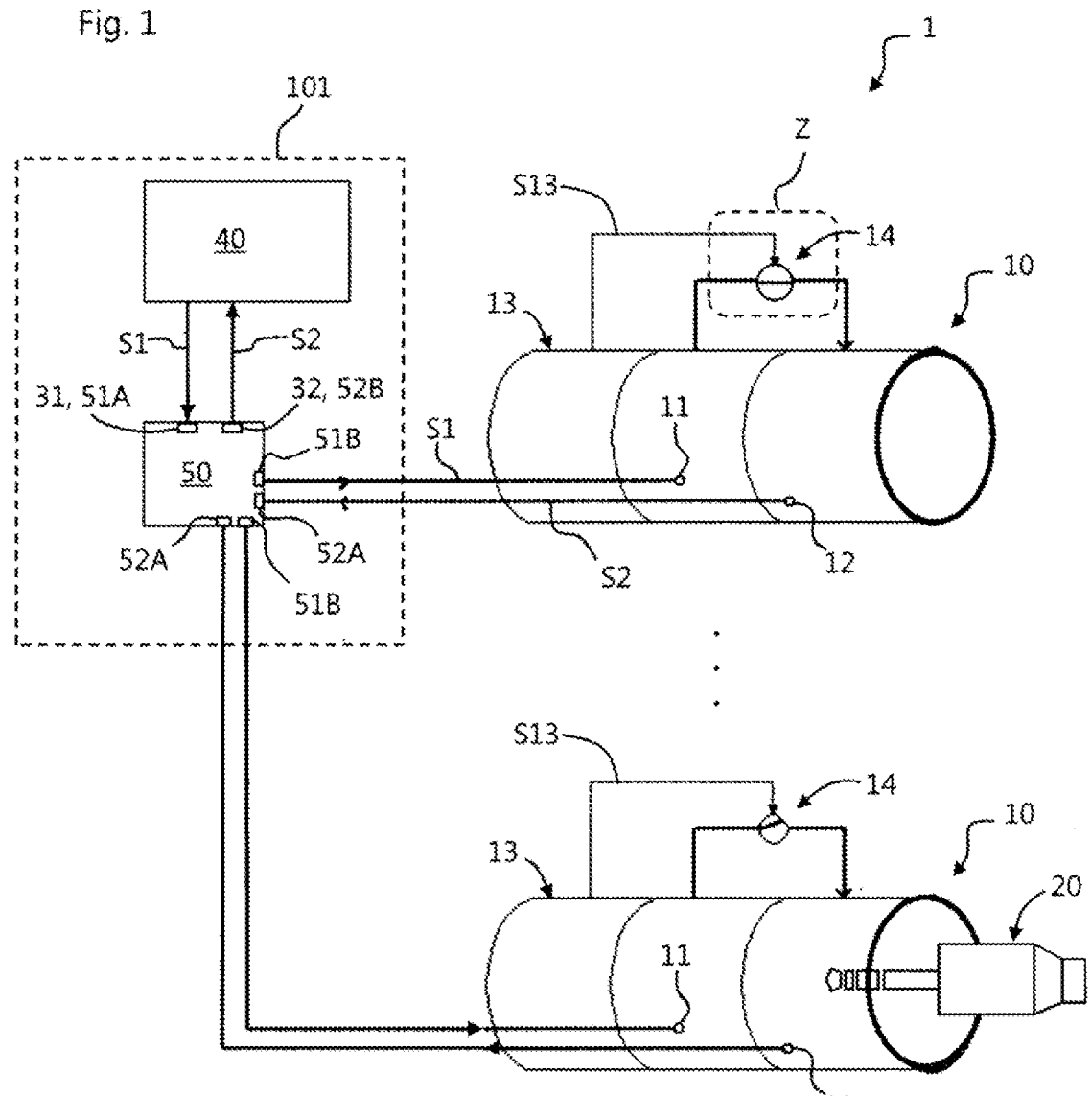
FIG. 2 shows a schematic, functional depiction of an audio communication system of an aircraft according to an exemplary embodiment of the present invention.

FIG. 2 shows a schematic, functional view of the audio communication system 1 of the aircraft 100. As shown in FIG. 2, the audio communication system 1 has at least one jack 10, an audio input 31, a microphone output 32 and a signal processing apparatus 40. Optionally, there is additionally provision for at least one amplifier 50. The audio communication system 1 depicted in purely exemplary fashion in FIG. 2 comprises two jacks 10 and an amplifier 50.

As shown in FIG. 2, the at least one jack 10 has an audio output 11, a microphone input 12, a plug detector 13 and a test bridge circuit 14. The jack 10 may, in particular, be embodied as a cylindrical socket into which a jack plug 20, in the form of a phone jack, of a headset 2 is pluggable. FIG. 2 depicts one of the jacks 10 in an unused state in which the jack 10 is free of a jack plug 20, or a jack plug 20 is not plugged into the jack 10. The other jack 10 shown in FIG. 2 is depicted in an unused state in which a jack plug 20 is plugged into the jack 10.

Figure 3:
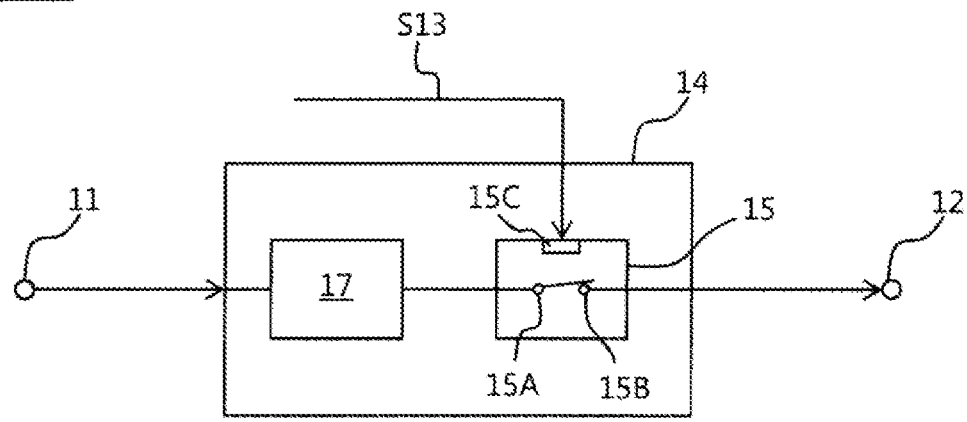
FIG. 3 shows a schematic detail view of a test bridge circuit of the audio communication system of an aircraft according to an exemplary embodiment of the present invention.
Figure 4:
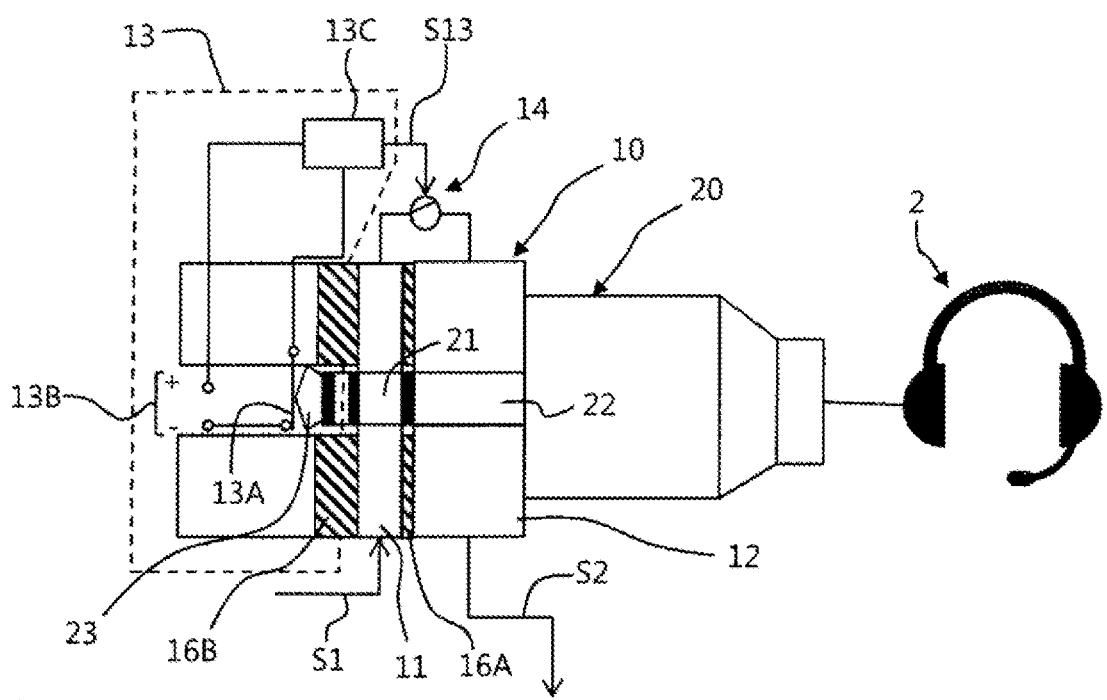
FIG. 4 shows a schematic detail view of a jack of the audio communication system of an aircraft according to an exemplary embodiment of the present invention, wherein the jack is depicted in an in-use state in which a jack plug is plugged into the jack.

FIG. 3 shows a schematic, functional detail view of the test bridge circuit 14. FIG. 4 shows a schematic, functional detail view of the jack 10, in particular, the plug detector 13 is depicted in detail.

FIG. 4 shows the jack 10 in the in-use state. As can be seen in FIGS. 1 and 4, the audio output 11 and the microphone input 12 may each be realized as cylindrical, electrically conductive sleeve bodies that are arranged coaxially and are at a distance and electrically insulated from one another by an insulation ring 16A. The plug detector 13 can likewise have a cylindrical, electrically conductive sleeve body that is arranged coaxially in relation to the sleeve bodies of the audio output 11 and the microphone input 12 and is at a distance and electrically insulated from these by an insulation ring 16B.

The plug detector 13 is realized as an electromechanical switch in exemplary fashion in FIG. 4. The plug detector 13 can have, for example, a mechanical switch 13A that is operable or displaceable by means of the jack plug 20, a voltage source 13B and a signal generator 13C, e.g., in the form of a voltage divider, that is connectable to the voltage source via the switch 13A. In the case of the plug detector 13 shown in the in FIG. 4 in exemplary fashion, when the jack plug 20 is plugged into the jack 10, the switch 13A is moved into a closed state and the signal generator 13C is connected to the voltage source 13B. As a result, a voltage that can be tapped off as an interrupt signal S13 is dropped across the signal generator 13C realized as a voltage divider. It goes without saying that the plug detector 13 can also be realized purely mechanically as a slider (not depicted) that is axially displaceable by the jack plug 20. In that case, the axial position of the slider forms the interrupt signal S13. Generally, the plug detector 13 is configured to generate an interrupt signal S13 when a jack plug 20 of a headset 2 is plugged into the jack 10.

FIG. 3 depicts a test bridge circuit 14 in exemplary fashion. This may be realized, for example, as an electronic switch having an electronically operable switching device 15 that has a power input 15A, a power output 15B and a control input 15C. By way of example, the switching device 15 may be designed such that it electrically connects the power input 15A to the power output 15B when the control input 15C has a voltage applied to it that is below a predetermined threshold value, for example a voltage having a value of zero.

As furthermore depicted in FIG. 3, the test bridge circuit 14 can have an optional attenuation element 17 that, connected in electrical series with the switching device 15 in, is configured to attenuate a test input signal S1, for example to reduce the amplitude thereof.

As depicted schematically in FIGS. 2 to 4, the test bridge circuit 14 is connected to the plug detector 13. In FIGS. 2 to 4, this is realized in exemplary fashion by means of electrical connection of the signal generator 13C of the plug detector 13 to the control input 15C of the switching device 15 of the test bridge circuit 14. The test bridge circuit 14 is further electrically connected to the audio output 11 of the jack 10 and to the microphone input 12 of the jack 10. In particular, the power input 15A may be electrically connected to the audio output 11 of the jack 10 and the power output 15B may be electrically connected to the microphone input 12 of the jack 10, as depicted schematically in FIG. 4. The test bridge circuit 14 is therefore configured to make an electrical connection between the audio output 11 of the jack 10 and the microphone input 12 of the jack 10.

In the in-use state of the jack 10 that is depicted in FIG. 4 in exemplary fashion, a microphone output 22 of the jack plug 20 of the headset 2 is electrically connected to the microphone input 12 of the jack 10, an audio input 21 of the jack plug 20 of the headset 2 is electrically connected to the audio output 11 of the jack 10 and an operating notch 23 of the jack plug 20 of the headset 2 operates the plug detector 13. The plug detector 13, as a result, generates an interrupt signal S13 that is transmitted to the control input 15C of the switching device 15 of the test bridge circuit 14 and thereby causes interruption of the electrical connection between the power input 15A and the power output 15B of the switching device 15. The test bridge circuit 14 is therefore configured to interrupt an electrical connection between the audio output 11 of the jack 10 and the microphone input 12 of the jack 10 when the plug detector 13 generates an interrupt signal S13.

As depicted schematically in FIG. 2, the audio input 31 is connected, for example wired, to the audio output 11 of the at least one jack 10. The microphone output 32 is connected, for example wired, to the microphone input 12 of the at least one jack 10.

The audio input 31 and the microphone output 32 are preferably provided for at the communication station 101 of the aircraft 100 and, generally, at the same point within the aircraft 100. As depicted in FIG. 2 in exemplary fashion, the audio input 31 may be formed by a first amplifier input 51A of the optional amplifier 50. In that case, a first amplifier output 51B of the amplifier 50, which is connected to the first amplifier input 51A, is connected to the audio output 11 of the jack 10. Optionally, there may furthermore also be provision for the microphone output 32 on the optional amplifier 50, for example in the form of a second amplifier output 52B. In that case, the microphone input 12 of the jack 10 is connected to a second amplifier input 52A of the amplifier 50, which is connected to the second amplifier output 52B. As shown in FIG. 2 in exemplary fashion, there can, in particular, be provision for in each case an audio input 31 and a microphone output 32 and also in each case a number of first amplifier outputs 51B and second amplifier inputs 52A that correspond to the number of jacks 10. Furthermore, there is provision in FIG. 2, in exemplary fashion, for an amplifier 50 for all the jacks 10. It goes without saying that each of the jacks 10 may also have an associated amplifier 50 of their own.

The optional amplifier 50 is depicted in FIG. 2 as part of the communication station 101 in exemplary fashion, but may also be realized separately therefrom. Generally, the amplifier 50 is designed to process a signal arriving at the amplifier inputs 51A, 52A such that an outgoing signal at the amplifier outputs 51B, 52B has a higher or lower signal strength than the incoming signal.

The signal processing apparatus 40 is depicted in FIG. 2 likewise as part of the communication station 101 in exemplary fashion, but may naturally also be realized separately therefrom. Generally, the signal processing apparatus 40 is connectable to the audio input 31 and to the microphone output 32, for example by means of electrical connecting cables. The signal processing apparatus 40 can have, in particular, a processor (not depicted) and a non-volatile data memory (not depicted) connected thereto that also stores a software program configured to prompt the processor to apply a test input signal S1 to the audio input, to tap off a test output signal S2 at the microphone output 32 and to use the test output signal S2 to ascertain a functional state of the audio communication system 1. It goes without saying that the test input signal S1 can also be provided in a manner other than by a processor, or provision thereof can be prompted in another manner, e.g., by connecting an electrical voltage source (not depicted) of the signal processing device 40 to the audio input 31. The test output signal S2 can also be evaluated in a manner other than by means of software, e.g., by virtue of an illuminant (not depicted) being coupled to the electrical voltage source (not depicted) of the signal processing device 40 via the microphone output 32 and a check being performed to determine whether the illuminant lights up when a test input signal S1 is applied, that is to say that the test output signal S2 arrives at the illuminant Generally, the signal processing apparatus 40 is designed to apply a test input signal S1 to the audio input, to tap off a test output signal S2 at the microphone output 32 and to use the test output signal S2 to ascertain a functional state of the audio communication system 1.

A method for testing the audio communication system 1 of the aircraft 100 is described below. A first step involves detecting whether the jack plug 20 of the headset is plugged into one of the jacks 10 of the audio communication system 1. This can be used, for example, with the plug detector 13 described above, which generates an interrupt signal S13 in the in-use state of the jack 10.

Subject to the condition that no jack plug 20 is detected at a respective jack 10, that is to say, no interrupt signal S13 is generated, the test bridge circuit 14 makes an electrical connection between the audio output 11 of the jack 10 and the microphone input 12 of the jack 10, e.g., by virtue of the switching device 15 taking an absent interrupt signal S13 as a basis for electrically connecting the power input 15A to the power output 15B.

The signal processing apparatus 40 is used to apply a test input signal S1 to the audio input 31. The signal processing device 40 can generate the test input signal S1 itself or can just connect it to the audio input 31. Optionally, a level of the test input signal S1 is attenuated. This attenuation can be effected, for example, by means of the optional attenuation element 17 of the test bridge circuit 14 or by means of the optional amplifier 50. Further, as test input signal S1 can be applied in the form of a wave signal of constant amplitude, e.g., in the form of a sine wave, the frequency of the test input signal S1 periodically, in particular continuously, covering a prescribed range.

Furthermore, a test output signal S2 is tapped off at the microphone output 32 and evaluated by means of the signal processing device 40. The result established for this evaluation is a functional state of the audio communication system 1.

The ascertaining of the functional state of the audio communication system 1 can comprise, in particular, comparing the test output signal S2 with the test input signal S1 and/or a comparison of the test output signal S2 with a reference signal associated with the respective test input signal S1. If the test output signal S2 differs from the test input signal S1 or another reference signal by more than a predetermined reference value, for example because the jack 10 itself or the wiring connecting the jack 10 to the audio input 31 or the microphone output 32 is defective, the functional state of the audio communication system 1 is classified as faulty. This ascertainment step of the method, optionally configured as a comparison, may be realized, for example, by a software function or by an electronic comparison element (not depicted) of the signal processing apparatus 40.

Although the present invention has been explained above in illustrative fashion on the basis of exemplary embodiments, it is not restricted thereto, but rather is modifiable in a wide variety of ways. In particular, combinations of the exemplary embodiments above are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Audio communication system
2 Headset
10 Jack
11 Audio output of the jack
12 Microphone input of the jack
13 Plug detector
13A Switch
13B Voltage source
13C Signal generator
14 Test bridge circuit
15 Switching device
15A Power input
15B Power output 15B
15C Control input
16A, 16B Insulating rings
17 Attenuation element
20 Jack plug
21 Audio input of the jack plug
22 Microphone output of the jack plug 31 Audio input
32 Microphone output
40 Signal processing apparatus
50 Amplifier
51A First amplifier input
51B First amplifier output
52A Second amplifier input
52B Second amplifier output
100 Aircraft
102 External structure
102A Wing
102B Landing gear receptacle
103 Fuselage
S1 Test input signal
S2 Test output signal
S13 Interrupt signal

The invention claimed is:

1. A method for testing an audio communication system of an aircraft, having the following method steps:
   detecting whether a jack plug of a headset is plugged into a jack of the audio communication system;
   subject to a condition that no jack plug is detected,
   making an electrical connection between an audio output of the jack and a microphone input of the jack by means of a test bridge circuit, wherein the test bridge circuit is disposed on the jack;
   applying a test input signal to an audio input connected to the audio output of the jack;
   receiving a test output signal at a microphone output connected to the microphone input of the jack; and
   using the test output signal to ascertain a functional state of the audio communication system.

2. The method according to claim 1, wherein the test input signal is applied to a first amplifier input, forming the audio input, of an amplifier of the audio communication system, and wherein a first amplifier output is connected to the audio output of the jack.

3. The method according to claim 2, wherein the test output signal is received at a second amplifier output, forming the microphone output, of the amplifier, and wherein a second amplifier input of the amplifier is connected to the microphone input of the jack.

4. The method according to claim 1, wherein a level of the test input signal is attenuated.

5. The method according to claim 4, wherein the level of the test input signal is attenuated by means of the test bridge circuit.

6. The method according to claim 1, wherein the test input signal is a wave signal of constant amplitude whose frequency periodically covers a prescribed range.

7. The method according to claim 6, wherein the frequency of the wave signal continuously covers the prescribed range.

8. The method according to claim 1, wherein the ascertaining of the functional state of the audio communication system comprises comparing the test output signal with the test input signal.

9. The method according to claim 1, wherein the ascertaining of the functional state of the audio communication system comprises a comparison of the test output signal with a reference signal associated with the respective test input signal.

10. An aircraft having an audio communication system comprising:
    a jack having an audio output,
    a microphone input,
    a plug detector which is configured to generate an interrupt signal when a jack plug of a headset is plugged into the jack,
    a test bridge circuit, connected to the plug detector, which is disposed on the jack and configured to interrupt an electrical connection between the audio output and the microphone input when the plug detector generates an interrupt signal;
    an audio input connected to the audio output of the jack;
    a microphone output connected to the microphone input of the jack; and
    a signal processing apparatus connectable to the audio input and the microphone output;
    wherein the signal processing apparatus is configured to apply a test input signal to the audio input, to receive a test output signal at the microphone output and to use the test output signal to ascertain a functional state of the audio communication system.

11. The aircraft according to claim 10, wherein the audio communication system has an amplifier having a first amplifier input, forming the audio input, and a first amplifier output, connected to the audio output of the jack.

12. The aircraft according to claim 11, wherein the amplifier has a second amplifier output, forming the microphone output, and a second amplifier input, connected to the microphone input of the jack.

13. The aircraft according to claim 10, wherein the aircraft has a multiplicity of jacks and wherein at least one jack is arranged on an external structure of the aircraft.

* * * * *